United States Patent [19]

Everest et al.

[11] 4,420,265

[45] Dec. 13, 1983

[54] INFRARED TEMPERATURE MONITORING APPARATUS HAVING MEANS FOR SKY RADIATION COMPENSATION

[76] Inventors: Charles E. Everest, 11662 Pincian Way, Santa Ana, Calif. 92705; Graham K. Walker, 168 B Suffolk St. West, Guelph, Ontario, Canada, N1H 2J8

[21] Appl. No.: 289,003

[22] Filed: Jul. 31, 1981

[51] Int. Cl.³ ............................ G01J 5/04; G01J 5/06
[52] U.S. Cl. .................................. 374/133; 374/161; 374/124; 250/338
[58] Field of Search ............... 374/121, 128, 2, 129, 374/124, 179, 133; 250/342, 338, 230

[56] References Cited

U.S. PATENT DOCUMENTS

| | | | |
|---|---|---|---|
| 2,562,864 | 7/1951 | Jury et al. | 250/230 X |
| 3,057,200 | 10/1962 | Wood | 374/123 |
| 3,112,790 | 12/1963 | Fredrick | 374/179 X |
| 3,444,739 | 5/1969 | Treharne | 374/124 |
| 3,617,745 | 11/1971 | Reed | 374/129 X |
| 3,777,568 | 12/1973 | Risgin et al. | 374/128 |
| 3,802,249 | 4/1974 | Clawson | 374/2 |
| 3,821,895 | 7/1974 | Sumikawa et al. | 374/124 |
| 3,935,460 | 1/1976 | Flint | 374/124 X |
| 3,999,069 | 12/1976 | Taylor et al. | 250/342 X |
| 4,005,698 | 2/1977 | Cuomo et al. | 374/121 X |
| 4,301,682 | 11/1981 | Everest | 374/121 X |

*Primary Examiner*—Daniel M. Yasich
*Attorney, Agent, or Firm*—Fisher, Tachner & Strauss

[57] ABSTRACT

An infrared thermometer primarily for agricultural applications utilizes an additional infrared sensor oriented for detection of sky radiation to compensate for reflection of sky radiation from the plant or other object to which the thermometer is directed. Preferably implemented in a gunlike, hand-held instrument, the invention utilizes a potentiometer for adjusting the signal level derived from a wide-angle, sky-directed sensor to account for changes in plant reflectivity characteristics. The adjusted signal is then summed with the signal derived from the conventional object-directed sensor to produce a composite signal which is applied to a meter-like device for display of object temperature with improved accuracy.

13 Claims, 2 Drawing Figures

INFRARED TEMPERATURE MONITORING APPARATUS HAVING MEANS FOR SKY RADIATION COMPENSATION

BACKGROUND OF THE INVENTION

1. FIELD OF THE INVENTION

The present invention pertains generally to infrared thermometers primarily for agricultural purposes and more specifically, to an improved infrared thermometer apparatus including means for making more accurate temperature measurements by compensating for reflected sky radiation.

2. PRIOR ART

It is well-known in the art to utilize infrared thermometers. Such temperature measuring devices are used in measuring the temperature of an object or a series of closely spaced adjacent objects by measuring the relative infrared radiation levles using an infrared detector such as a thermopile. In these devices it is typical for a circuit to be used to convert the signal produced by the infrared detector and associated circuitry such as, for example, an amplifier and a linearization circuit into an output signal capable of indicating a numerical value. This output signal is then utilized in a meter type structure such as a digital display or a known meter movement in order to indicate a numerical temperature value. Exemplary of such prior art devices are those disclosed in U.S. Pat. Nos. 4,078,179 and 4,132,902, both issued to Everest, one of the joint inventors of the present invention. Still another exemplary illustration of an infrared temperature measurement device is disclosed in the Everest U.S. patent application Ser. No. 069,269 filed Aug. 24, 1979, now U.S. Pat. No. 4,301,682.

The temperature indication of such devices normally corresponds to the temperature of an object or a series of objects as indicated by the relative levels of radiation of such objects and of the infrared detector itself. Such infrared thermometers are considered to be very desirable for many purposes but they are particularly suitable for agricultural applications where they are normally constructed as hand-held gun-like instruments which can be easily and conveniently used.

Unfortunately, such infrared thermometers when used for agricultural applications are inherently inaccurate because they do not account for reflections from the plant surfaces produced by sky emanating radiation. This failure to take into account plant reflectance of sky radiation can adversely affect the accuracy of the temperature reading to varying degrees depending upon sky conditions and the reflection coefficient of the vegetation to which the temperature measuring instrument is directed. The inaccuracy resulting from the failure to account for sky radiation reflection may, in fact, become fairly significant because of the inherent small difference between the infrared temperature of the plants and the ambient air temperature, both of these parameters being used in at least one prior art device for making stress degree measurements which require a comparison of the temperature of a plant or of a crop canopy with the ambient temperature adjacent the plant or crop canopy to determine whether or not a plant or crop is stressed due to a need for watering or irrigation. Such a stress degree measuring instrument is disclosed in applicant's prior U.S. patent application Ser. No. 069,269, now U.S. Pat. No. 4,301,682, which is incorporated herein by reference.

SUMMARY OF THE INVENTION

The present invention overcomes the aforementioned disadvantages of the prior art by providing an improved infrared thermometer primarily for agricultural use and which provides a novel means for sensing the level of infrared radiation received by the vegetation from a skyward direction whereby the reflection by the vegetation of such incident sky radiation may be taken into account in determining the infrared temperature of the plant to thereby preclude the inaccuracies of the prior art. More specifically, the present invention utilizes a novel wide-angle, sky-directed radiation sensor in combination with circuit means which provides an adjustment for the signal produced by that sensor to compensate for the reflection coefficient of different plant surfaces.

In the particular embodiment disclosed herein as exemplary of the invention, the infrared thermometer is in the form of a hand-held gun-like instrument in which the wide-angle sky radiation sensor of the invention is installed on the upwardly facing surface of the instrument to provide proper automatic orientation of the sensor relative to the sensing direction of the conventional infrared sensor directed at the plant being measured.

OBJECTS

It is therefore a primary object of the present invention to provide an improved infrared thermometer primarily for agricultural use which substantially overcomes or reduces the noted disadvantages of the prior art.

It is an additional object of the present invention to provide an improved infrared thermometer primarily for agricultural use and which provides means for sensing and compensating for plant reflected sky radiation that would otherwise adversely effect the accuracy of the temperature measurement.

It is still an additional object of the present invention to provide an infrared thermometer primarily for agricultural use in the form of a hand-held, gun-like instrument which employs the novel addition of a wide-angle sky-directed radiation sensor for producing a temperature measurement indication which includes a factor related to the effects of incident sky radiation.

It is still a further object of the present invention to provide an improved agricultural infrared thermometer which includes a novel sky-directed wide-angle radiation sensor and associated circuitry for including the effecfs of reflected sky radiation on the temperature measurement and which additionally provides means for adjusting the magnitude of the signal derived from the sky-directed sensor for compensating for plant reflection characteristics.

BRIEF DESCRIPTION OF THE DRAWINGS

The aforementioned advantages and objects of the present invention as well as additional advantages and objects thereof will be more fully understood hereinafter as a result of the detailed description of a preferred embodiment of the invention taken in conjunction with the accompanying figures in which.

DETAILED DESCRIPTION OF A PREFERRED EMBODIMENT

Figure 1:
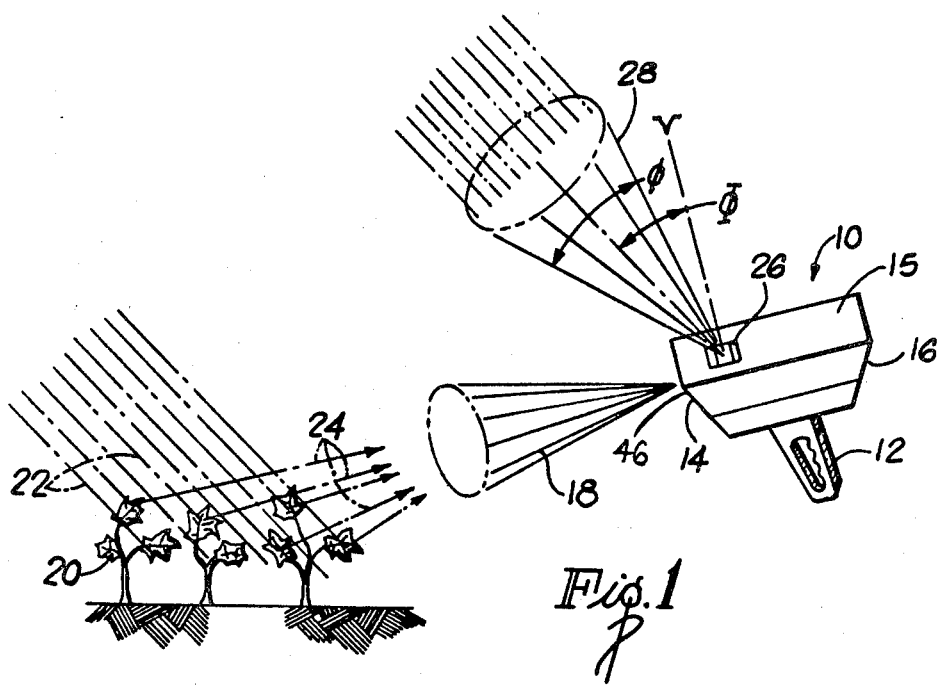
FIG. 1 is a three-dimensional illustration showing an embodiment of the present invention in use for measuring the infrared temperature of nearby vegetation while compensating for the effects of the reflection of sky infrared radiation from such plants.

Referring now to FIG. 1 there is shown therein a hand-held, gun-like infrared temperature measuring instrument 10 of the type having a handle 12 for providing a convenient means for holding and directing the instrument, having a front face 14 in which a conventional narrow beam infrared sensor (not shown) may be directed toward an object, the temperature of which is to be measured, and having a rear face 16 which typically includes a conventional meter type structure (not shown) such as a digital display or a known meter movement to indicate a numerical temperature value as is well-known in the art.

However unlike prior art hand-held, gun-like temperature measurement instruments, in the present invention the top surface 15 of instrument 10 includes a wide-angle sky-directed radiation first sensor 26, the purpose and function of which will now be more fully explained. More particularly, as shown in FIG. 1, when the gun-like, hand-held infrared thermometer 10 is directed toward some vegetation such as illustrative plants 20, the relatively narrow beam (represented by the radiation cone 18) of the conventional forward-directed sensor in face 14 will, in addition to sensing the normal plant infrared radiation levels, also sense reflected radiation originating from a skyward direction. By way of example, in FIG. 1 parallel lines 22 of radiation incident from the sky are reflected by one or more surfaces of the vegetation 20 and result in at least some reflected radiation, lines 24, which are oriented to be also received by the conventional infrared sensor of instrument 10 through the beam represented by cone 18. As previously indicated, prior art instruments do not provide any means for sensing the contribution of infrared radiation derived from reflections of sky radiation from vegetation being measured. As a result, the degree to which such reflections affect the results in temperature indication is not compensated for in such prior art instruments and this defeats the accuracy of the measurement process. However, in the present invention the center of wide-angle sky radiation sensor 26 is oriented on the top surface 15 of the instrument at an angle Φ to the normal ν to receive a wide conical angle φ of incident sky radiation as a result of the wide-angle beam 28 through which radiation lines 22 also pass in a direct non-reflected path due to the orientation of sensor 26 on instrument 10.

Figure 2:
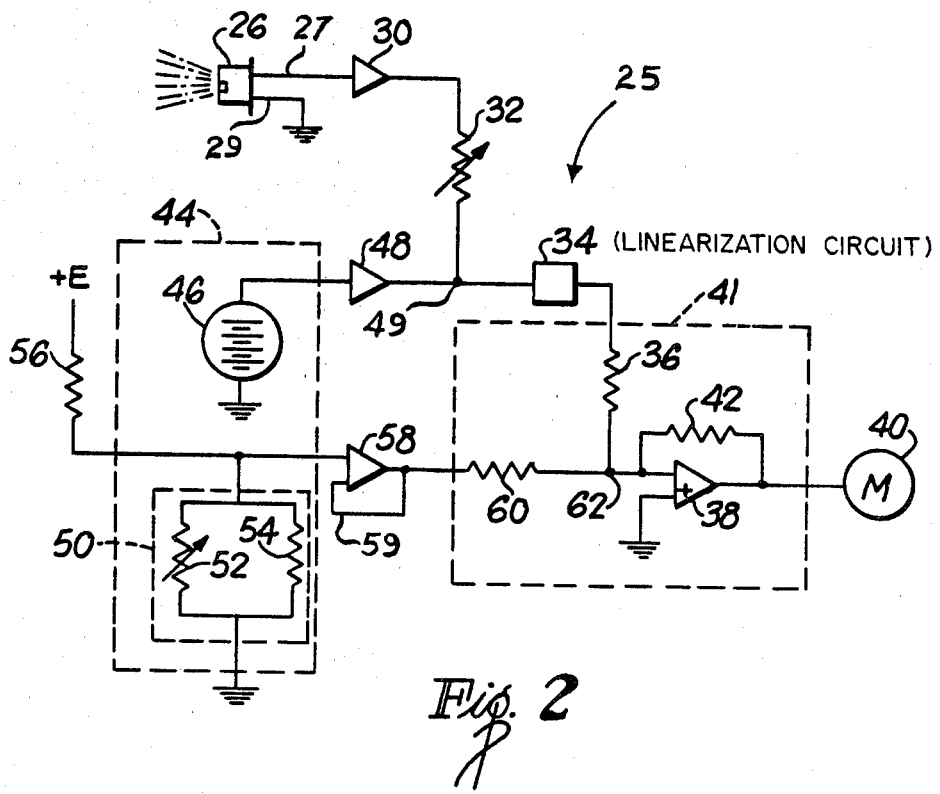
FIG. 2 is a simplified schematic diagram of the infrared thermometer of FIG. 1 illustrating the manner in which the wide-angle sensor and adjustment means of the present invention may be integrated into a conventional infrared thermometer circuit.

The manner in which sensor 26 is utilized in the instrument 10 to compensate for the level of sky radiation and plant reflectance thereof will now be described in conjunction with the circuit schematic diagram of FIG. 2. A circuit 25, illustrated in FIG. 2, has been designed to utilize the operative concepts or principles of the invention verbally expressed in the appended claims forming a part of this disclosure. In the interest of brevity details which are considered to be within the scope of routine design and engineering skill in the field of temperature measurement through the use of infrared detectors have been omitted from the drawing and from the remainder of the specification. Thus, for example, the drawing does not indicate the preferred utilization of the illustrated circuit in a hand-held infrared thermometer or gun and neither are specific details of conventional sub-circuits illustrated in the drawing. Referring to FIG. 2, it will be seen that the wide-angle sky radiation sensor 26 includes a pair of output terminals 27 and 29, terminal 27 being connected to the input of an inverting preamplifier 30 and terminal 29 being connected to ground potential. The output signal of inverting preamplifier 30 is applied to a sensitivity potentiometer 32 in a series configuration, the opposite terminal of potentiometer 32 being connected to the input of a linearization circuit 34. The output of linearization circuit 34 is applied to a summing circuit 41 which comprises summing resistors 36 and 60, summing junction 62 and a summing operational amplifier 38 which has a feedback loop comprising a feedback resistor 42. The output of summing operational amplifier 38 is applied to a meter device 40 which is representative of any of a plurality of possible and well-known display devices to provide a visible temperature indication.

Linearization circuit 34 also receives an input from the conventional infrared thermometer portion of the circuit which, in the embodiment illustrated in FIG. 2, comprises an second infrared detector 46 in the form of a commercially available thermopile structure. The output of thermopile structure 46 is applied to a conventional preamplifier 48, the output of which is connected to junction 49 to which the output of sky radiation sensor 26 is also applied via inverting preamplifier 30 and sensitivity potentiometer 32.

Because the particular infrared detector used for the conventional sensing function of the present invention is described as a thermopile structure 46 it is necessary to utilize with it various circuit components as hereafter described so as to provide a reference temperature so that the value of temperature displayed on meter 40 will in fact correspond to the plant temperature. A thermistor network 50 is employed in the circuit 25 for this purpose. In the interest of brevity this network 50 is illustrated as including a thermistor 52 and a linearizing resistor 54 connected in parallel. The linearizing resistor 54 is considered necessary because of the normally non-linear properties of the thermistor 52. As a practical matter, the thermistor network 52 employed is preferably a commercial unit including several thermistors and several linearizing resistors. Such a network is described in U.S. Pat. No. 3,316,765.

Network 50 is in series with another resistor 56 across a carefully controlled voltage E as indicated in FIG. 2 so as to achieve a voltage dividing effect such that a varying signal is supplied to a conventional buffer amplifier 58 employed for impedance adjustment purposes in accordance with conventional practice. Amplifier 58 includes a conventional feedback loop 59 and conveys a signal corresponding to ambient temperature to the summing circuit 41 through summing resistor 60 which is also connected to summing junction 62. Thermopile structure 46, acting in conjunction with thermistor network 50, typically within a common heat sink structure represented by dotted line 44, in effect compares its own level of infrared radiation, a measure of which is provided by thermistor network 50, with the level of infrared radiation given off by an object or a series of closely located objects toward which the thermopile 46 is directed, as for example, through the use of conventional optics. Thus, circuit 25 in effect correlates the differential between the levels of object and ambient infrared radiation so that the meter 40 indicates the temperature of the object or objects noted. However, unlike prior art devices, meter 40 also responds to the effects of sky-radiation reflection as a result of the action of wide-angle sky-radiation sensor 26, inverting preamplifier 30, and sensitivity potentiometer 32. Increased radiation sensed by sensor 26 will, as a result of the inverting action of preamplifier 30, reduce the signal level contributed by radiation sensor 26 and delivered to linearization circuit 34 in accordance with an attenuation factor determined by the setting of potentiometer 32. Potentiometer 32 is adjusted to provide a setting corresponding to a precalibrated resistance selected in accordance with the reflectivity characteristics of the vegetation to which the instrument 10 is directed. As a result, the signal level produced by thermopile 46 acting through preamplifier 16 will be reduced by the effects of radiation sensor 26 in detecting sky radiation and compensated by the selected calibration adjustment of potentiometer 32. The resultant signal is applied through linearization circuit 34 and summing resistance 36 to summing junction 62. As noted previously, summing junction 62 also receives a signal from thermistor network 50 through summing resistor 60 whereby the net effect of the signals derived from sensor 26, thermopile 46 and thermistor network 50 is a more realistic amplified signal applied to meter 40 which represents the actual temperature of the objects being measured and including a novel correction factor that compensates for that portion of the infrared radiation received from the vegetation that is caused by reflection of sky radiation.

It will now be understood that what has been disclosed herein is an improved infrared thermometer primarily for use in agricultural applications. The improvement comprises a novel sky radiation sensor and associated circuitry that provide a signal representing a compensation factor which improves the accuracy of the temperature indication by taking into account that portion of the measured infrared radiation that is attributable to reflection of incident sky radiation. It is to be noted the term "incident sky radiation" has been used for purposes of brevity and that the actual direction of radiation depends on relative temperatures. Thus, for example, given the relative lower sky temperature, the detectors of the present invention would ordinarily give up radiation to the sky in directions opposite to those shown in FIG. 1.

As a result of applicant's teaching herein it will now be apparent to those having ordinary skill in the art to which the present invention pertains that various modifications and additions can be made to the invention without deviating from its primary function. For example, it is preferable to use a wide-angle sensor for the novel sky radiation reflection function of the invention in order to obtain a broad averaged indication of sky radiation, the term wide-angle being defined as a solid conical angle $\phi$ of at least 45 degrees as shown in FIG. 1. However it is also feasible and well within the teachings of the present invention to use a narrower angle sky-directed sensing device. The present invention has been disclosed by way of an illustrative embodiment in which particular temperature sensing devices have been illustrated and wherein the signals generated thereby have been processed in an analogue manner using conventional analog circuit elements such as operational amplifiers. However, it will be clear that other temperature devices may be used instead and that non-analog circuit devices may also be used. For example, it would be within the scope of fthe present invention to provide a microprocessor controlled digital system wherein analog-to-digital converters were utilized to convert the analog signals produced by temperature sensors into a digital signal compatible with such microprocessor devices. Accordingly, all such modifications and additions are contemplated to be within the scope of fthe present invention which is to be limited only by the appended claims.

We claim:

1. An improved apparatus for measuring the temperature of an object using a first detector in a portable instrument for detecting the infrared radiation emanating therefrom, the improvement comprising:

a second detector in said portable instrument for detecting secondary infrared radiation emanating from a source other than said object, said secondary radiation being reflected by said object into said first detector, means for adjusting the relative output signals produced by said first and second detectors, respectively, for providing a correction signal for calibration of the reflection characteristics of said reflected secondary radiation of said object, means for combining said relative output signals with a reference signal to produce a composite signal having said correction signal, which is indicative of the temperature of said object and compensates for the reflection by said object of said secondary radiation, and means for displaying a temperature value corresponding to said composite signal.

2. The improved apparatus recited in claim 1 wherein said source of secondary infrared radiation is the sky.

3. The improved apparatus recited in claim 1 wherein said object is a form of plant life.

4. The improved apparatus created in claim 1 wherein said adjusting means comprises a potentiometer.

5. The improved apparatus recited in claim 1 wherein said combining means comprises an operational amplifier.

6. The improved apparatus recited in claim 1 wherein said first detector comprises a thermopile.

7. The improved apparatus recited in claim 1 wherein said first detector comprises a thermistor.

8. The improved apparatus recited in claim 1 wherein said first detector comprises a pyro-electric device.

9. The improved apparatus recited in claim 1 wherein said second detector comprises a thermopile.

10. The improved apparatus recited in claim 1 wherein said second detector comprises a thermistor.

11. The improved apparatus recited in claim 1 wherein said second detector comprises a pyro-electric device.

12. The improved apparatus recited in claim 1 wherein the angle of radiation reception of said second detector is at least ten times the angle of radiation reception of said first detector.

13. The improved apparatus recited in claims 1, 2, 3, 4, 5, 6, 7, 8, 9, 10, 11, or 12 wherein said first detector is oriented for detection of radiation from a substantially horizontal direction, and wherein said second detector is oriented for detection of radiation from a direction substantially 45 degrees above the horizontal direction.

* * * * *